United States Patent [19]

Wohlford

[11] 4,108,502

[45] Aug. 22, 1978

[54] JOINT ASSEMBLY FOR LINKS OF ENDLESS TRACK

[75] Inventor: William Paul Wohlford, Bettendorf, Iowa

[73] Assignee: Deere & Company, Moline, Ill.

[21] Appl. No.: 772,690

[22] Filed: Feb. 28, 1977

[51] Int. Cl.² ............................................. B62D 55/20
[52] U.S. Cl. ..................................... 305/14; 305/58 R
[58] Field of Search ................... 305/58 R, 14, 11, 59; 74/251 R, 251 C, 257

[56] References Cited

U.S. PATENT DOCUMENTS

| 1,063,493 | 6/1913 | Allen | 305/58 |
| 2,970,866 | 2/1961 | Horste | 305/58 X |

FOREIGN PATENT DOCUMENTS

| 539,328 | 9/1941 | United Kingdom | 305/11 |

*Primary Examiner*—Robert B. Reeves
*Assistant Examiner*—John P. Shannon

[57] ABSTRACT

Provided are three joint assembly embodiments which each employ one or more threaded pivot pins for joining the leading ends of a first pair of track links with the trailing ends of a second pair of track links and for supporting a bushing adapted for engagement by a drive sprocket. In a first embodiment, the interior of the bushing and the leading ends of the second pair of links are threaded and receive a pair of threaded fasteners and the trailing ends of the first pair of links are pressed on the opposite ends of the bushing. A second embodiment differs from the first embodiment in that only one threaded fastener is used, the opposite ends of the exterior of the bushing are threaded and the trailing ends of the first pair of links are respectively threadedly received thereon. Also, a split wear bushing is removably received on the first-mentioned bushing. A third embodiment is similar to the second in that only one fastener is used however one end of the fastener is not threaded and has the trailing end of one of the second links received thereon.

1 Claim, 3 Drawing Figures

JOINT ASSEMBLY FOR LINKS OF ENDLESS TRACK

BACKGROUND OF THE INVENTION

The present invention relates to crawler tractor tracks and more specifically relates to sealed pivot or hinge joints between track link links.

A primary problem area in current crawler track design is the lack of durability in the track link pivot joints. It is elementary that wear at the pivot joints can be reduced by designing them to contain lubricant, however, there arises the difficulty of sealing the track joints to retain lubricant and at the same time keep out particles of abrasive materials through which the tracks travel during operation.

SUMMARY OF THE INVENTION

According to the present invention there is provided a novel pivot or hinge connection for crawler tractor track. Specifically, according to a first embodiment of the invention, the leading ends of a first pair of links are pressed onto the opposite ends of a bushing, which has a threaded interior. The trailing ends of a second pair of links are respectively provided with a pair of threaded openings and are disposed at the opposite ends of the bushing and pivotally joined thereto be means of a pair of threaded fasteners which cooperate with the bushing to define a central cavity for holding lubricant.

According to a second embodiment of the invention, the trailing ends of a first pair of links are threaded and respectively received on threaded end portions of the exterior of a first bushing and a wear bushing, which is split along its length for easy installation and removal, is received about the first bushing between the threaded end portions thereof. The first bushing has a threaded interior and disposed at opposite ends thereof are the trailing ends of a second pair of links, the latter link ends being respectively provided with threaded openings and being connected to the first bushing by means of a single threaded fastener which has a central recessed portion that cooperates with the bushing to define a central cavity for holding lubricant.

According to a third embodiment of the invention, the leading ends of a first pair of track links are respectively pressed on the opposite ends of a track bushing. Disposed at the opposite ends of the bushing are the trailing ends of a second pair of track links, one of the trailing ends being provided with a threaded opening and the other being provided with a smooth opening. A single threaded pin is received in the threaded opening of the one trailing link end and is threaded into the bushing and has a dog point received in the smooth opening of the other trailing link end. The fastener has a central recessed portion which cooperates with the bushing to define a cavity for containing lubricant.

An object of the invention is to provide a track link hinge or pivot joint which is durable and relatively easy to assemble and disassemble.

A more specific object is to provide a hinge joint including one or more threaded fasteners which serve to hold the parts together and to seal lubricant in a cavity defined by the joint.

These and other objects of the invention will become apparent from a reading of the ensuing description together with the appended drawing.

DESCRIPTION OF THE PREFERRED EMBODIMENT

Figure 1:
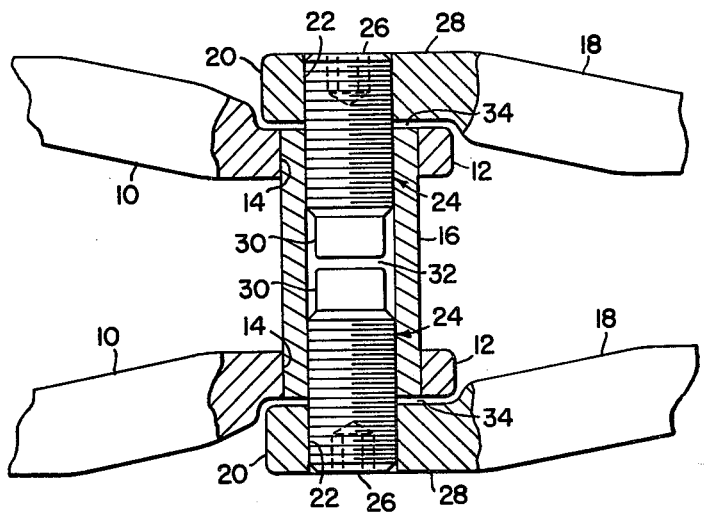
FIGS. 1 - 3 are partial sectional views respectively depicting three different embodiments of track link joints constructed according to the principles of the present invention.

A first track link joint embodiment is illustrated in FIG. 1 and includes, with reference to movement of the track joint from left to right, a first pair of track links 10 having respective leading ends 12 provided with smooth openings 14 respectively having the opposite ends of a bushing 16 press fit thereinto. A second pair of track links 18 respectively have trailing ends 20 provided with threaded openings 22 respectively disposed at opposite ends of and in axial alignment with a threaded interior of the bushing 16. Respectively threaded into the ends 20 of the links 18 and into the opposite ends of the bushing 16 are a pair of threaded fasteners which are here shown in the form of a pair of set screws 24 having respective socket heads 26 disposed flush with respective outer surfaces 28 of the links 18 and having respective dog points 30 cooperating with the bushing 16 to define a cavity 32 for holding lubricant. The set screws 24 are locked in the link 18 by conventional means (not shown) so that during flexure of the links 10 and 18 relative to each other all pivoting takes place at the threaded interface of the bushing 16 with the screws 24. It is here noted that in order to ensure that such flexure can freely occur, during assembly of the screws 24 a clearance space 34 is maintained between the adjacent ends of the pair of links 10 and 18.

Figure 2:
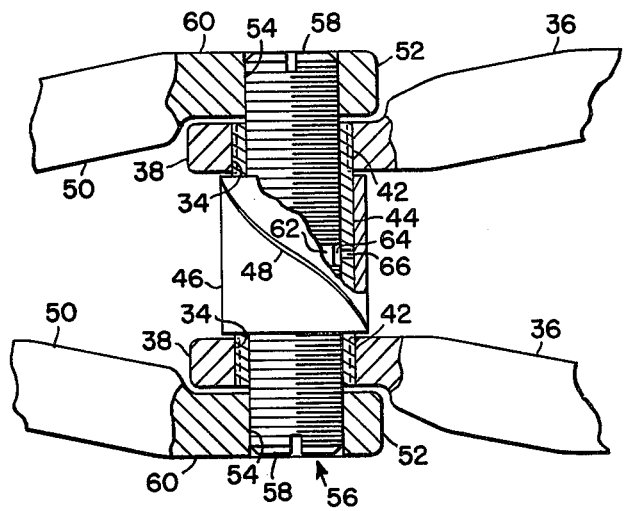

A second track link joint embodiment is illustrated in FIG. 2 and includes, with reference to movement of the track joint from left to right, a first pair of track links 36 having respective trailing ends 38 provided with threaded openings 40 respectively in which are received exteriorly threaded opposite end portions 42 of an inner bushing 44. Received on the bushing 44 between the threaded end portions 42 thereof is a wear bushing 46 made of spring metal and split from end to end, as at 48, along a helical line so as to permit the bushing 46 to be deflected at the split 48 to permit its installation or removal without necessitating removal of the links 36 from the inner bushing 44. A second pair of links 50 have respective leading ends 52 disposed at the opposite ends of the bushing 44. The link ends 52 are respectively provided with threaded openings 54 which are axially aligned with a threaded interior of the bushing 44 and a threaded fastener 56 is received in the link ends 52 and the bushing 44 and has opposite slotted ends 58 disposed flush with respective outer surface portions 60 of the links 50. The fastener 56 has an unthreaded reduced-in-diameter portion 62 located midway between the ends 58 and cooperating with the bushing 44 to define a cavity 64 for holding lubricant. A radial opening 66 is provided in the bushing 44 for communicating lubricant with the interface between the inner bushing 44 and wear bushing 46.

Figure 3:
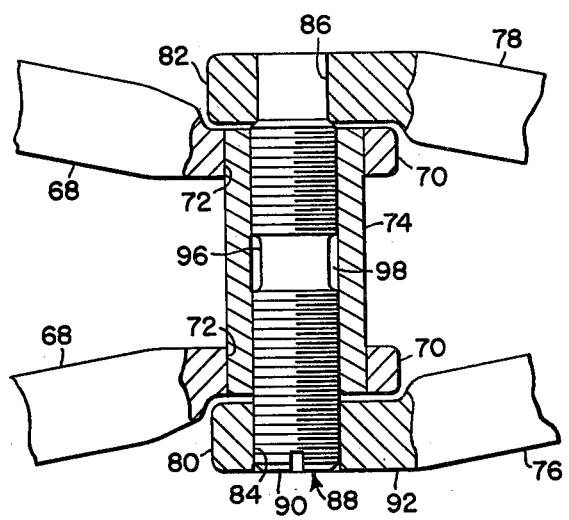

A third track link joint embodiment is disclosed in FIG. 3 and includes, with reference to movement of the track joint from left to right, a first pair of links 68 having respective leading ends 70 provided with smooth openings 72 respectively having the opposite ends of a bushing 74 press fit thereinto. A second pair of links 76 and 78 respectively have trailing ends 80 and 82 disposed at opposite ends of the bushing 74, the end 80 being provided with a threaded opening 84 and the end 82 being provided with a smooth opening 86. The interior of the bushing 74 is threaded and a threaded fastener 88 is threaded through the link end 80 and through the bushing 74 and has a slotted head 90 located flush with an outer surface 92 of the link 76 and has a dog point 94 onto which the link end 82 may be either pressed or slip fit. In the case of a slip fit, conventional means, not shown, would be provided at least at one of the ends of the fastener 88 so as to prevent relative rotation between the fastener 88 and the link ends 80 and 82. The fastener 88 includes a reduced in diameter portion 96, located midway between its opposite ends, which cooperates with the bushing 74 to define a cavity 98 for holding lubricant.

In each of the joint embodiments described above, the use of threads as the pivotal interface of the joint is advantageous in the following respects:

(1) The threads provide a positive method of maintaining the spatial relationship of the links and the spatial relationship can be easily adjusted.

(2) Threaded fasteners of the type employed are standard components which are inexpensive and readily available.

(3) The threaded fasteners facilitate easy field maintenance since (a) the fasteners may be removed and installed with ordinary tools and (b) the fasteners obviate the need for separate "master" link parts which allows any link of the track to be removed individually without disassembly of an entire section of track.

(4) The threaded bearing surface interface between the one pair of links and the bushing provides a zero clearance interface with relatively more wear surface than is obtained with the smooth surface slip fit of conventional designs.

(5) The zero clearance fit provides a labyrinth seal arrangement which excludes the entry of abrasive particles and, thereby, prolongs the service life of the components.

(6) The thread fit at the interface between the bushing and one pair of links provides a means which distributes lubricant as the links flex relative to each other, such distribution maintaining a lubricant film at the interface which aids in sealing out liquid contaminants and reduces the frictional energy consumed in track flexure and, thus, reduces the track wear rate.

In addition to the above-listed advantages, each of the disclosed joint embodiments has one or more further advantages. Specifically, the joint embodiment disclosed in FIG. 1 has the further advantage that in factory assembly, two fasteners may be assembled simultaneously, thereby, reducing assembly time as compared to the use of a single screw.

The joint embodiment disclosed in FIG. 2 has the further advantages of eliminating all press fits and the need for tools to accomplish the same and the wear bushing thereof will rotate during operation to thus lessen the wear that would otherwise occur thereto due to scrubbing forces imposed thereon by the teeth of a track drive sprocket and to thus obviate the need to disassemble the track and rotate the bushings.

The joint embodiment disclosed in FIG. 3 has the further advantage, as compared to the embodiment disclosed in FIG. 2, of ensuring proper assembly. Specifically, a potential problem in assembly exists when link ends are threaded at random in production since the threads will not all have the same angular starting position and this may cause a problem in maintaining a desired clearance between adjacent link ends. This problem is eliminated by the design of this embodiment since a slip or press fit is provided at one end of the threaded fastener.

The operation of the present invention is thought to be apparent from the foregoing description and for the sake of brevity no further discussion of the operation is given.

I claim:

1. An improved track section for a track laying tractor, comprising: a bushing having a threaded interior; a first pair of track links having first ends respectively received on opposite ends of the bushing; a second pair of track links respectively having threaded bores in one of their ends; and first and second threaded fasteners respectively being received in the threaded bores of the second pair of track links and in the opposite ends of bushing.

* * * * *